(12) United States Patent
Kim

(10) Patent No.: US 10,246,352 B2
(45) Date of Patent: Apr. 2, 2019

(54) WATER TREATMENT APPARATUS USING ELECTROSTATIC FIELD

(71) Applicant: Sang Uk Kim, Incheon (KR)

(72) Inventor: Sang Uk Kim, Incheon (KR)

( * ) Notice: Subject to any disclaimer, the term of this patent is extended or adjusted under 35 U.S.C. 154(b) by 182 days.

(21) Appl. No.: 15/285,464

(22) Filed: Oct. 4, 2016

(65) Prior Publication Data

US 2017/0101330 A1    Apr. 13, 2017

(30) Foreign Application Priority Data

Oct. 13, 2015   (KR) ........................ 10-2015-0143110

(51) Int. Cl.
| | | |
|---|---|---|
| *C02F 1/461* | (2006.01) | |
| *C02F 1/46* | (2006.01) | |
| *C02F 1/467* | (2006.01) | |
| *C02F 101/20* | (2006.01) | |
| *C02F 101/30* | (2006.01) | |

(52) U.S. Cl.
CPC ............ *C02F 1/4608* (2013.01); *C02F 1/467* (2013.01); *C02F 2101/203* (2013.01); *C02F 2101/30* (2013.01); *C02F 2201/483* (2013.01); *C02F 2303/04* (2013.01); *C02F 2303/08* (2013.01)

(58) Field of Classification Search
None
See application file for complete search history.

(56) References Cited

U.S. PATENT DOCUMENTS

| | | | | |
|---|---|---|---|---|
| 3,972,800 | A * | 8/1976 | King | ...................... B03C 5/02 |
| | | | | 204/671 |
| 10,041,177 | B2 * | 8/2018 | Nourbakhsh | ......... C02F 1/4606 |
| 2003/0057086 | A1 * | 3/2003 | McLaine | ................ B01J 19/088 |
| | | | | 204/164 |
| 2011/0139609 | A1 * | 6/2011 | Liu | ....................... C02F 1/4674 |
| | | | | 204/275.1 |
| 2014/0262826 | A1 * | 9/2014 | Rao | ........................... C02F 9/00 |
| | | | | 205/751 |

\* cited by examiner

*Primary Examiner* — Brian W Cohen
(74) *Attorney, Agent, or Firm* — Revolution IP, PLLC

(57) ABSTRACT

Disclosed is an electrostatic field water treatment apparatus comprising: a high voltage unit to which a high voltage is to be supplied, and an earth ground unit connected to an earth ground and used as a pipe through which water is to pass, wherein the high voltage unit is disposed at a central part of the earth ground unit and comprises a high voltage insulation cable to which a high voltage is to be supplied and an electrode case configured to cover the high voltage insulation cable and consisting of an insulator.

1 Claim, 15 Drawing Sheets

WATER TREATMENT APPARATUS USING ELECTROSTATIC FIELD

CROSS REFERENCE TO RELATED APPLICATION

The present application claims priority from Korean Patent Application Number 10-2015-0143110 filed on Oct. 13, 2015, the entire contents of which are incorporated herein for all purposes by this reference.

BACKGROUND OF THE INVENTION

The present invention relates to a water treatment apparatus.

A water treatment apparatus is provided for a piping configured to supply water, cold water, warm water and the like to a variety of buildings requiring water such as a factory, an apartment, a swimming pool and a bathhouse, and is used for preventing corrosion and rust of the piping and also for preventing generation and accumulation of bacteria or scale in the piping.

In order to prevent and remove the scale, a method of applying an electric field to the piping, i.e., a method of using an electrostatic field is used.

FIG. 1 depicts an example of the water treatment apparatus of the related art.

A water treatment apparatus using an electrostatic field (hereinafter, simply referred to as 'electrostatic field water treatment apparatus') serves as a dielectric having anode (+) and cathode (−) surfaces, like an electrostatic capacitive capacitor. For example, when a cylindrical pipe or a flat plate-type pipe is applied with direct current or pulse direct current of anode (+) and cathode (−), an electrostatic field is formed between the anode (+) and the cathode (−).

When water exists between the anode (+) electrode and the cathode (−) electrode, an electric field is filled across the water. In order to treat much water over a wide area, a flat plate-type water treatment apparatus having an anode (+) electrode and a cathode (−) electrode may be provided.

In the cylindrical structure, the capacitance can be expressed as follows.

$$C = \frac{Q}{V} = \frac{2\pi\varepsilon_0 l}{\ln(b/a)} \quad \text{[equation 1]}$$

herein,
C: capacitance, Q: charge quantity, V: voltage,
L: length of cylinder,
$\varepsilon_0$: dielectric constant of vacuum ($8.854 \times 10^{-12}$ F/m), ln: Napierian logarithm,
a: distance from center of cylinder to outer diameter of electrode,
b: distance from center of cylinder to inner diameter of pipe.

In the flat plate-type structure, the capacitance can be expressed as follows.

$$C = \frac{Q}{V} = \frac{\varepsilon_0 A}{d} \quad \text{[equation 2]}$$

herein,
A: sectional area (m$^2$) of flat plate, d: distance (m) of flat plate.

A principle of the electrostatic field water treatment apparatus is to apply a very high direct current voltage or pulse voltage (maximum 1,000V or higher) to the anode (+) electrode and the cathode (−) electrode of the pipe structure or flat plate-type structure so as to influence particles, bacteria and the like in the water. In this case, a magnitude of current is very small (0.01 A or less) and does not influence performance of the apparatus.

The cell membrane of the bacteria in the water has a phospholipid bilayer and consists of hydrophilic head parts and hydrophobic tail parts. A material to be transferred into the cell moves thorough the protein in the cell membrane. The surface tension of phospholipid is appropriately balanced, so that the structure of the cell membrane is maintained.

When the bacteria exist in the electrostatic field water treatment apparatus having a very high electrostatic field, the surface tension characteristic of the bacteria moving in the water stream is changed by the high electrostatic field, so that the balance of the cell membrane is upset. As a result, the positions and structures of the hydrophilic head parts and hydrophobic tail parts of phospholipid are newly modified, so that parts to be aligned and parts to be destroyed are generated. During the process, the cell membrane is formed with a hole, so that foreign matters such as water and ions are introduced into the cell. Thereby, the bacteria swell and die out.

Also, the electrostatic field water treatment apparatus having a very high electrostatic field is configured to supply electrons to the water flowing between (+) and (−) electrodes, to electrically neutralize cations (Ca++, Mg++, Fe++) of the scale component, and to apply a repulsive force. Thereby, it is possible not only to generate the scale component but also to separate crystalline compound of the scale attached to the existing discharge piping. Also, the electrons to be included in the water increase, so that it is possible to suppress the corrosion, which is to be caused due to electron elution of metal. The electrostatic field water treatment apparatus is based on the principle of the capacitor using the high dielectric constant ($\varepsilon \approx 80$) of water.

For example, in the electrostatic field water treatment apparatus, the dielectric electrode having anode (+) and cathode (−) surfaces, like the electrostatic capacitive capacitor, is configured as follows.

The electrodes can be classified into a high potential electrode and a low potential electrode. In this case, the electrode of which potential is 0V is connected to an earth ground, and the earth ground becomes a cathode (−) electrode. The high potential electrode (about +1,000V or −1,000V) becomes an anode (+) electrode.

A large current flows through the water between the anode (+) and cathode (−) surfaces. Therefore, in order to suppress the current flow at the maximum and to configure an electrode having the same principle as the electrostatic capacitive capacitor, the high potential anode (+) electrode is connected to a conductor made of copper, aluminum, titanium, iron or the like, and the conductor is sealed with close adhesion by an insulation film 20 made of rubber, ceramic, Teflon, polyethylene, polypropylene, polyurethane, PVC or the like and is stably insulated up to the service lift (five years or longer) depending on the high voltage to be applied. The cathode (−) electrode consists of the conductor, and is connected to a water coupling pipe main body and the earth ground.

Making an additional remark, in the electrostatic field water treatment apparatus, as shown in FIG. 1, an electrode rod 10 is mounted in a cylindrical pipe 30 through which the water flows. The cylindrical pipe 30 is applied with the (−) voltage and the internal electrode rod 10 disposed in the cylindrical pipe 30 is applied with the (+) voltage. Here, it is important how much the internal electrode rod 10 is stably insulated.

In the electrostatic field water treatment apparatus of the related art, the insulation film 20 is used so as to insulate the internal electrode rod 10. In this case, it is difficult to perform an assembling operation. Also, when the insulation film 20 is formed with a pinhole, the dielectric breakdown may be caused. Therefore, careful attention should be paid to the protection of the insulation film 20 of the internal electrode rod 10.

In order to insulate the internal electrode rod 10, Teflon may be used as the insulation film 20. However, Teflon is difficult to be processed and is high in price. The service life of the electrostatic field water treatment apparatus using Teflon is shortened at the high voltage, so that a replacement time period of the electrode rod is short. Therefore, when Teflon is used, the managing cost may increase.

In order to insulate the internal electrode rod 10, ceramic may be used as the insulation film 20. However, the ceramic is difficult to be processed and is expensive. The service life of the ceramic is very long. However, the ceramic is fragile and is difficult to be handled.

Also, in the electrostatic field water treatment apparatus of the related art as shown in FIG. 1, a water inlet direction and a water outlet direction are perpendicular to each other, so that resistance against the water flow is caused in the electrostatic field water treatment apparatus. Also, the electrostatic field water treatment apparatus of the related art is difficult to be mounted to the existing pipe equipment.

SUMMARY OF THE INVENTION

The present invention has been made to solve the above problems, and an object of the present invention is to provide an electrostatic field water treatment apparatus in which a water inlet direction and a water outlet direction form a straight line.

In an aspect of the present invention, provided is an electrostatic field water treatment apparatus including: a high voltage unit to which a high voltage is to be supplied, and an earth ground unit connected to an earth ground and used as a pipe through which water is to pass, wherein the high voltage unit is disposed at a central part of the earth ground unit and includes a high voltage insulation cable to which a high voltage is to be supplied and an electrode case configured to cover the high voltage insulation cable and consisting of an insulator, wherein the pipe is formed of any one conductor of iron, aluminum, copper and titanium, wherein the high voltage is a direct current voltage or a pulse voltage and has a value between +1,000V and −1,000V, wherein the insulator is formed of any one of glass, polyethylene, polypropylene, PVC and Teflon, wherein a magnitude of current is 0.01 A or less, and wherein a water inlet direction and a water outlet direction of the earth ground unit are provided at one end or both ends of the earth ground unit.

In another aspect of the present invention, provided is an electrostatic field water treatment apparatus including: a high voltage unit including a high voltage insulation cable to which a high voltage is to be supplied; a pipe through which water is to pass and which is covered by the high voltage insulation cable, and an earth ground unit disposed in the pipe, formed to have a rod shape and connected to an earth ground, wherein the high voltage is a direct current voltage or a pulse voltage and has a value between +1,000V and −1,000V, wherein the earth ground unit is formed of any one conductor of iron, aluminum, copper and titanium, wherein a shape of the pipe is rectangular or cylindrical, wherein a part of the pipe covered by the high voltage unit is formed of any one insulator of polyethylene, polypropylene and PVC, and wherein a magnitude of current is 0.01 A or less.

In still another aspect of the present invention, provided is an electrostatic field water treatment apparatus including: a water inlet fixing member coupled to a pipe into which water is to be introduced; a turbo generator fixed to the water inlet fixing member and configured to generate electricity; an electrostatic field water treatment unit configured to remove bacteria or scale included in the water introduced through the pipe by using a high voltage; a fixing unit coupled to the electrostatic field water treatment unit and fixed to the turbo generator; a high-voltage converter configured to change a voltage generated at the turbo generator into a high voltage; a filter configured to filter the water having passed through the electrostatic field water treatment unit; a water outlet fixing member coupled to a pipe through which the water is to be discharged, and a main body configured to cover the turbo generator, the electrostatic field water treatment unit, the fixing unit, the high-voltage converter and the filter disposed between the water inlet fixing member and the water outlet fixing member, wherein the electrostatic field water treatment unit includes a high voltage unit to which the high voltage is to be supplied and an earth ground unit connected to an earth ground and used as a pipe through which the water is to pass, wherein the high voltage unit is disposed at a central part of the earth ground unit and includes a high voltage insulation cable to which a high voltage is to be supplied and an electrode case configured to cover the high voltage insulation cable and consisting of an insulator, wherein the high voltage is a direct current voltage or a pulse voltage and has a value between +1,000V and −1,000V, wherein the insulator is formed of any one of glass, polyethylene, polypropylene, PVC and Teflon, and wherein a magnitude of current is 0.01 A or less.

In still another aspect of the present invention, provided is an electrostatic field water treatment apparatus including: a water inlet fixing member coupled to a pipe into which water is to be introduced; a turbo generator fixed to the water inlet fixing member and configured to generate electricity; an electrostatic field water treatment unit configured to remove bacteria or scale included in the water introduced through the pipe by using a high voltage; a fixing unit coupled to the electrostatic field water treatment unit and fixed to the turbo generator; a high-voltage converter configured to change a voltage generated at the turbo generator into a high voltage; a filter configured to filter the water having passed through the electrostatic field water treatment unit; a water outlet fixing member coupled to a pipe through which the water is to be discharged, and a main body configured to cover the turbo generator, the electrostatic field water treatment unit, the fixing unit, the high-voltage converter and the filter disposed between the water inlet fixing member and the water outlet fixing member, wherein the electrostatic field water treatment unit includes a high voltage unit including a high voltage insulation cable to which the high voltage is to be supplied, a pipe through which water is to pass and which is covered by the high voltage insulation cable, and an earth ground unit disposed in the pipe, formed to have a rod shape and connected to an earth ground, wherein a part of the pipe covered by the high voltage unit is formed of an insulator, wherein the high voltage is a direct current voltage or a pulse voltage and has a value between +1,000V and −1,000V, wherein the insulator is formed of any one of glass, polyethylene, polypropylene, PVC and Teflon, and wherein a magnitude of current is 0.01 A or less.

In still another aspect of the present invention, provided is an electrostatic field water treatment apparatus including: a water inlet fixing member coupled to a pipe into which water is to be introduced; a turbo generator fixed to the water inlet fixing member and configured to generate electricity; an electrostatic field water treatment unit configured to remove bacteria or scale included in the water introduced through the pipe by using a high voltage; a fixing unit coupled to the electrostatic field water treatment unit and fixed to the turbo generator; a high-voltage converter configured to change a voltage generated at the turbo generator into a high voltage; a filter configured to filter the water having passed through the electrostatic field water treatment unit; a water outlet fixing member coupled to a pipe through which the water is to be discharged, and a main body configured to cover the turbo generator, the electrostatic field water treatment unit, the fixing unit, the high-voltage converter and the filter disposed between the water inlet fixing member and the water outlet fixing member, wherein the electrostatic field water treatment unit includes a high voltage unit to which the high voltage is to be supplied and a pipe through which water is to pass and which is connected to an earth ground, wherein the high voltage unit is disposed in the pipe and is formed to have a rod shape, wherein a surface of the pipe is provided with a high voltage unit support member configured to support the rod-shaped high voltage unit and is formed with a penetration part through which the rod-shaped high voltage unit passes, wherein a support member configured to support the rod-shaped high voltage unit is provided in the pipe, wherein the pipe and the fixing unit serve as the earth ground, and wherein a magnitude of current is 0.01 A or less.

The electrostatic field water treatment apparatus of the present invention can be easily mounted to a water supply device such as a shower.

DETAILED DESCRIPTION OF ILLUSTRATIVE EMBODIMENTS

Hereinafter, illustrative embodiments of the present invention will be described in detail with reference to the drawings.

Figure 1:
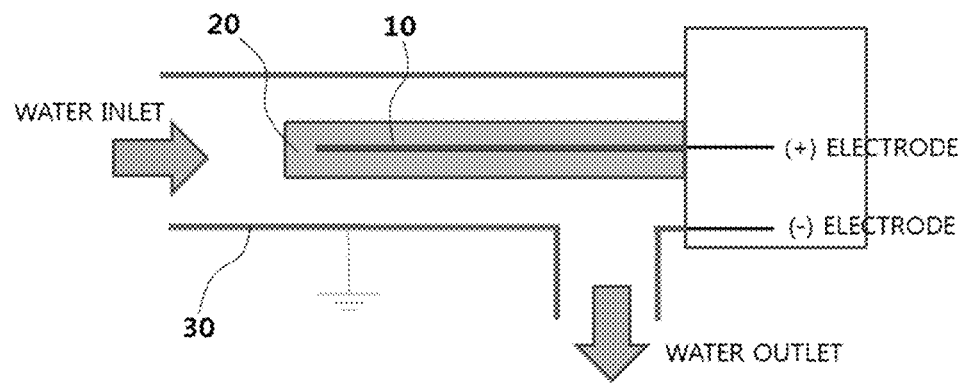
FIG. 1 depicts an example of a water treatment apparatus of the related art.
Figure 2:
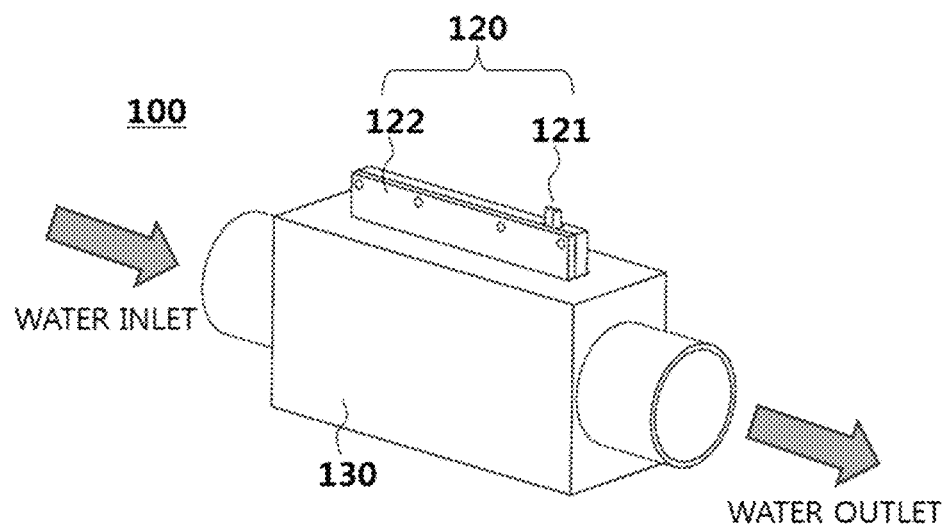
FIG. 2 depicts an example of an electrostatic field water treatment apparatus in accordance with a first illustrative embodiment of the present invention.
Figure 3:
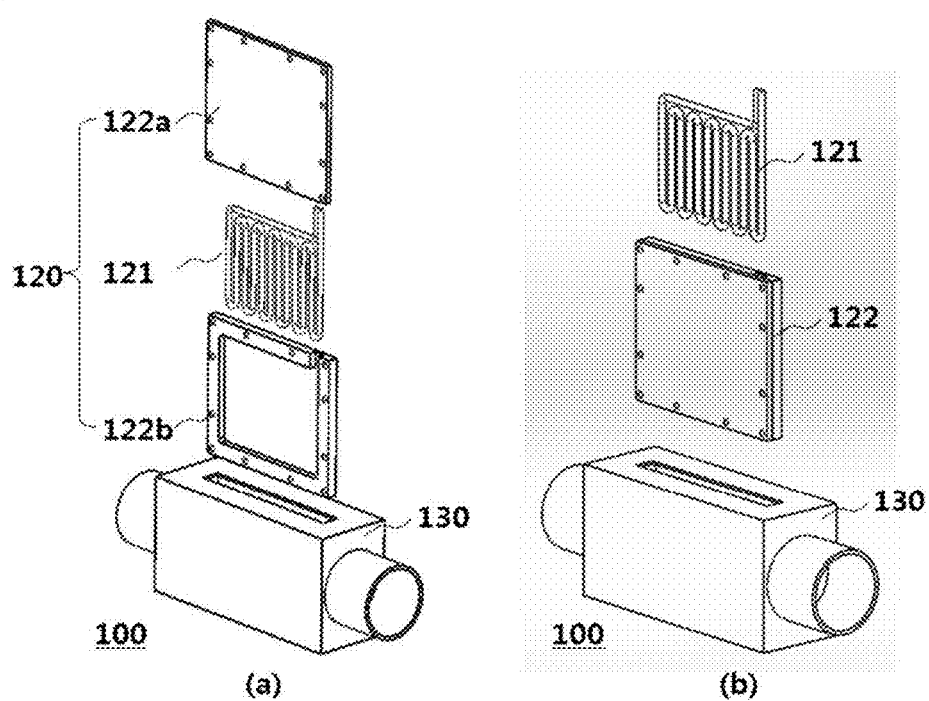
FIG. 3 is an exploded perspective view of the electrostatic field water treatment apparatus in accordance with the first illustrative embodiment of the present invention.
Figure 4:
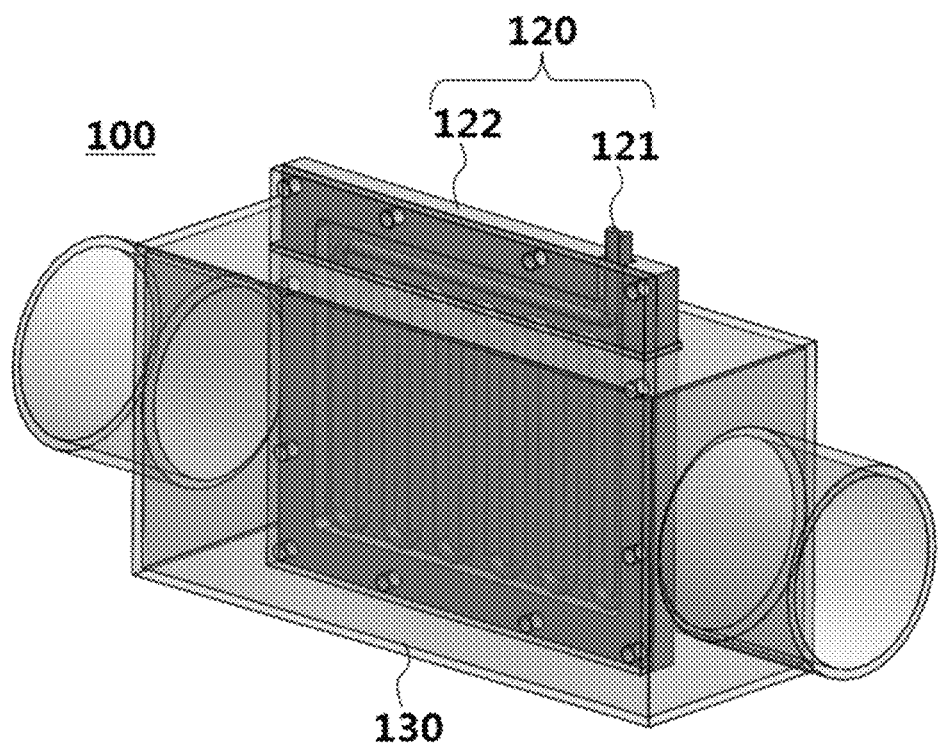
FIG. 4 is a projective perspective view of the electrostatic field water treatment apparatus in accordance with the first illustrative embodiment of the present invention.
Figure 5:
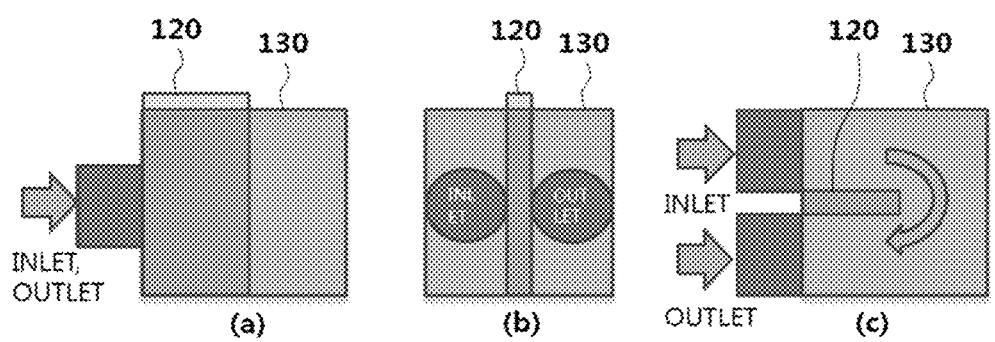
FIG. 5 depicts an example of a structure of the electrostatic field water treatment apparatus in accordance with the first illustrative embodiment of the present invention.

FIG. 2 depicts an example of an electrostatic field water treatment apparatus in accordance with a first illustrative embodiment of the present invention, FIG. 3 is an exploded perspective view of the electrostatic field water treatment apparatus in accordance with the first illustrative embodiment of the present invention, FIG. 4 is a projective perspective view of the electrostatic field water treatment apparatus in accordance with the first illustrative embodiment of the present invention, and FIG. 5 depicts an example of a structure of the electrostatic field water treatment apparatus in accordance with the first illustrative embodiment of the present invention.

An electrostatic field water treatment apparatus 100 in accordance with the first illustrative embodiment of the present invention includes a high voltage unit 120 to which a high voltage is to be supplied and an earth ground unit 130 connected to an earth ground and used as a pipe through which water passes, and the high voltage unit 120 is disposed at a central part of the earth ground unit 130, as shown in FIGS. 2 to 4.

The high voltage unit 120 includes a high voltage insulation cable 121 to which a high voltage is to be supplied and an electrode case 122 configured to cover the high voltage insulation cable 121. In a general electrostatic field water treatment apparatus, an anode (+) electrode has a metal conductor to which a high voltage (+1,000V or higher or −1,000V or lower) is to be applied and an insulator configured to surround the conductor. In this case, a magnitude of current is very small. For example, the magnitude of current may be about 0.01 A or less.

However, in the present invention, as the anode (+) electrode, the high voltage insulation cable 121 conforming to the high voltage to be applied is used, and a separate insulation material is not used for the anode (+) electrode. The high voltage insulation cable 121 is configured by unfolding the cable in a flat and close manner, as shown in FIGS. 3(*a*), 3(*b*) and 4. For example, copper is disposed at a center of the high voltage insulation cable 121 and may be covered by a primary insulator, and the primary insulator may be covered by a secondary insulator.

The electrode case 122 is provided so that the high voltage insulation cable 121 can keep the flat shape, and is configured so that water does not permeate therethrough. The electrode case 122 includes a first case 122*a* and a second case 122*b*. The high voltage insulation cable 121 is disposed in a space between the first case 122*a* and the second case 122*b*. The electrode case 122 is formed of glass, polyethylene, polypropylene, PVC, Teflon or the like, which is a solid insulator capable of enduring a water pressure.

The high voltage unit 120 is positioned at a center of the earth ground unit 130.

The earth ground unit 130 is connected to the earth ground. The earth ground unit 130 may be a pipe through which water passes.

For example, the pipe is used as a cathode (−) electrode, i.e., the earth ground unit 130. In this case, the pipe is applied with 0V and the pipe is grounded. The pipe is formed of a conductor of iron, aluminum, copper, titanium or the like.

A shape of the pipe may be rectangular or cylindrical. As shown in FIGS. 2 to 4, a water inlet direction and a water outlet direction of the pipe may be a straight line or may be changed into a variety of forms depending on equipment states.

For example, as shown in FIGS. 5(*a*), 5(*b*) and 5(*c*), the water inlet direction and the water outlet direction of the pipe may be provided at one end of the pipe.

Figure 6:
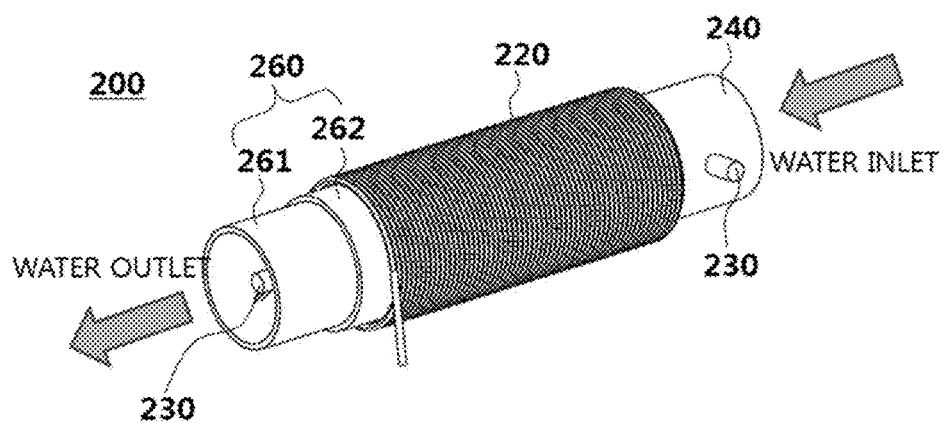
FIG. 6 depicts an example of a configuration of the electrostatic field water treatment apparatus in accordance with the first illustrative embodiment of the present invention.
Figure 7:
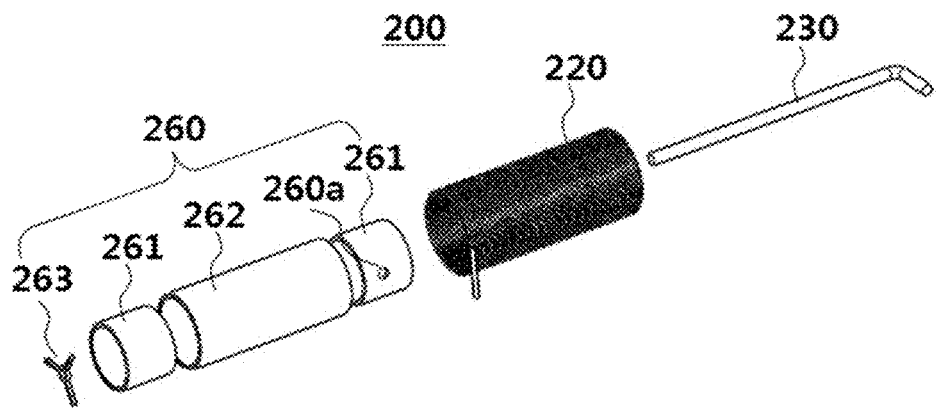
FIG. 7 is an exploded perspective view of an electrostatic field water treatment apparatus in accordance with a second illustrative embodiment of the present invention.
Figure 8:
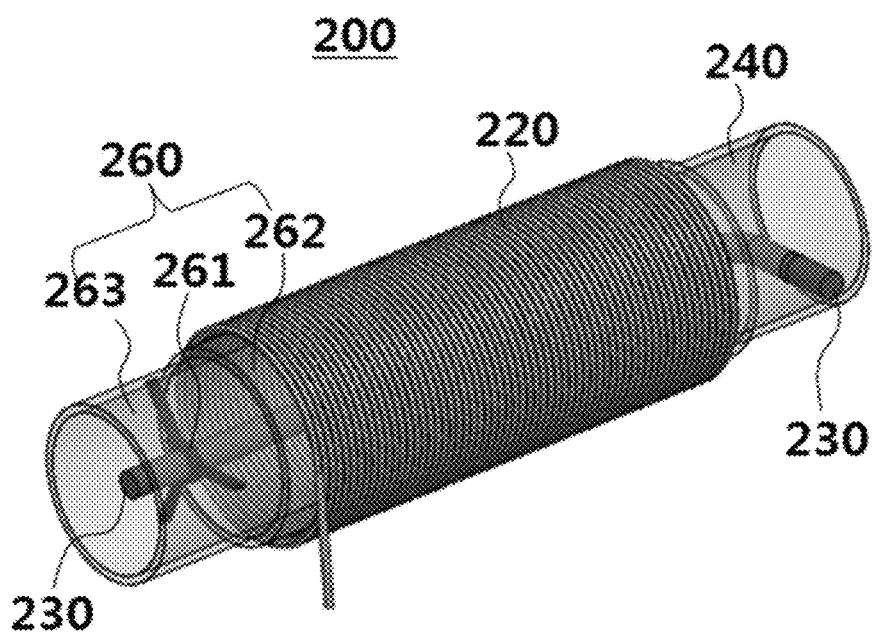
FIG. 8 is a projective perspective view of the electrostatic field water treatment apparatus in accordance with the second illustrative embodiment of the present invention.

FIG. 6 depicts an example of a configuration of the electrostatic field water treatment apparatus in accordance with the first illustrative embodiment of the present invention, FIG. 7 is an exploded perspective view of an electrostatic field water treatment apparatus in accordance with a second illustrative embodiment of the present invention, and FIG. 8 is a projective perspective view of the electrostatic field water treatment apparatus in accordance with the second illustrative embodiment of the present invention.

An electrostatic field water treatment apparatus 200 in accordance with the second illustrative embodiment of the present invention includes a high voltage unit 220 having a high voltage insulation cable to which a high voltage is to be supplied, a pipe 260 which is surrounded by the high voltage insulation cable and water passes therethrough, and an earth ground unit 230 disposed in the pipe, formed to have a rod shape and connected to an earth ground, as shown in FIGS. 6 to 8. Herein, a part 262 of the pipe 260 surrounded by the high voltage unit 220 is formed of a non-conductor.

The pipe 260 is formed with an earth ground unit hole 260*a* through which the earth ground unit 230 passes. The pipe 260 is provided therein with a support member 263 configured to support the earth ground unit 230.

Therefore, the pipe 260 may include a second part 262 surrounded by the high voltage unit 220, a first part 261 not surrounded by the high voltage unit 220 and the support member 263.

The second part 262 of the pipe 260 surrounded by the high voltage unit 220 is formed of a non-conductor. For example, the second part 262 may be formed of polyethylene, polypropylene, PVC or the like, which is a non-conductor.

The first part 261 of the pipe 260 not surrounded by the high voltage unit 220 may be formed of a conductor or an insulator.

The support member 263 may be formed of an insulator.

However, when the first part 261 is formed of a conductor, the support member 263 may be formed of a conductor. In this case, the first part 261 and the support member 263 may be connected to the earth ground.

The water inlet and outlet directions of the pipe 260 may be changed.

As shown in FIGS. 6 to 8, the earth ground unit 230 is formed to have a rod shape. One side of the earth ground unit 230 passes through the pipe 260 via the earth ground unit hole 260*a*, and the other side of the earth ground unit 230 is disposed in the pipe 260. In this case, the other side of the earth ground unit 230 is supported by the support member 263.

Making an additional remark, in the second illustrative embodiment of the present invention, as the high voltage unit 220, a high voltage insulation cable conforming to a high voltage to be applied is used. In this case, a separate insulation material is not used.

The high voltage insulation cable is closely wound on an outer side of the cylindrical or rectangular pipe, particularly, on an outer side of the second part 262.

The earth ground unit 230 may be formed of a conductor of iron, aluminum, copper or titanium.

The earth ground unit 230 is positioned at a center of the pipe 260 and is conductively fixed to the hole of the pipe so that the water does not leak. The earth ground unit 230 is fixed to the support member 263.

The earth ground unit 230 is coupled to the first part 261 formed of a conductor of iron, aluminum, copper, titanium or the like. The earth ground unit 230 is applied with 0V and the earth ground unit 230 is grounded.

The water inlet direction and the water outlet direction may be a straight line or may be changed into a variety of forms depending on the shape of the pipe.

Figure 9:
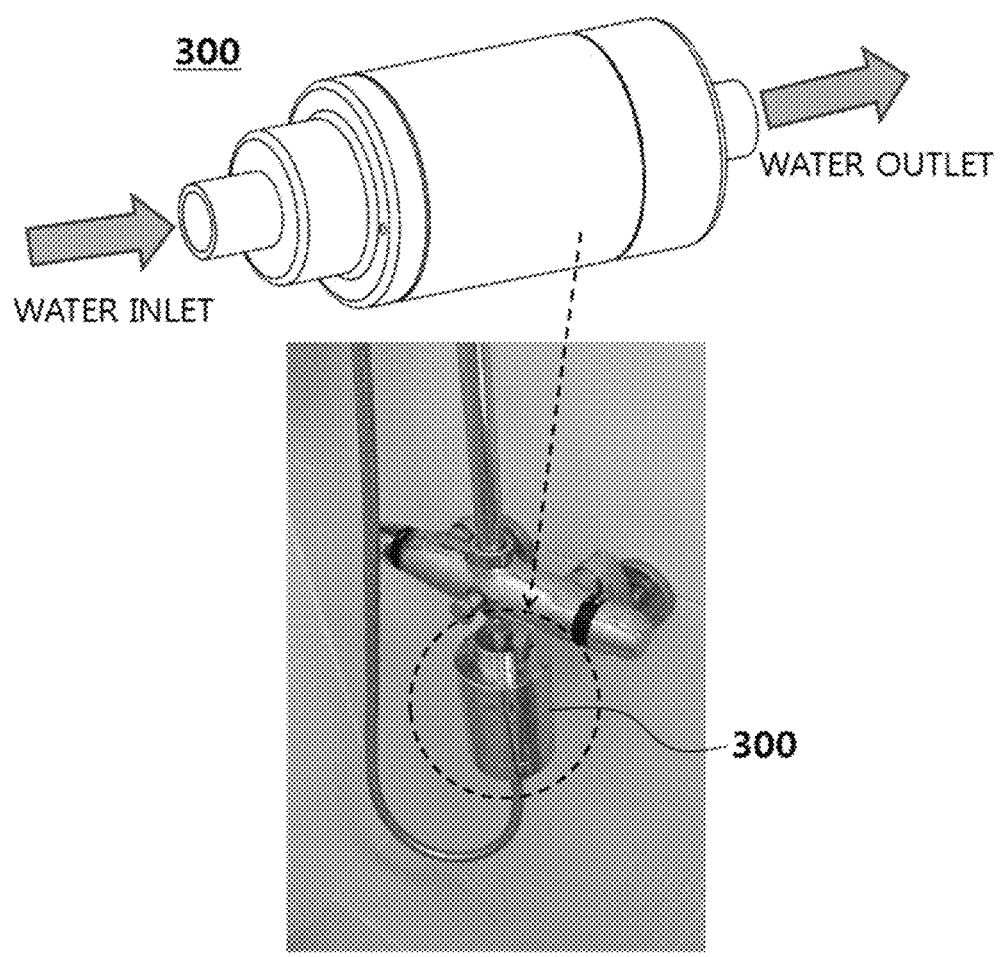
FIG. 9 depicts an example of a configuration of an electrostatic field water treatment apparatus in accordance with a third illustrative embodiment of the present invention.
Figure 10:
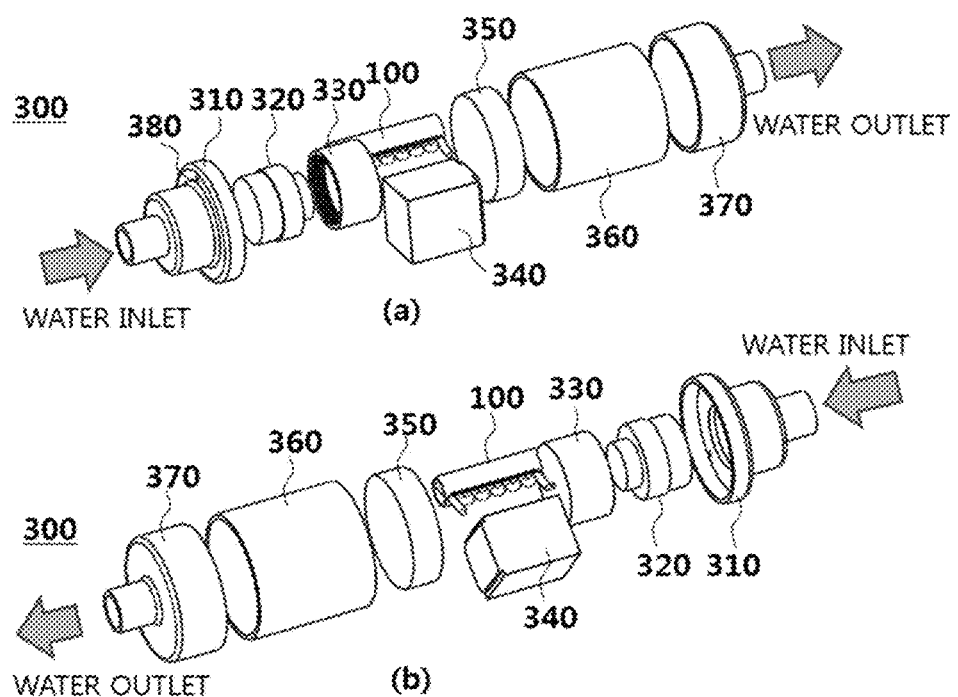
FIG. 10 is an exploded perspective view of the electrostatic field water treatment apparatus in accordance with the third illustrative embodiment of the present invention.
Figure 11:
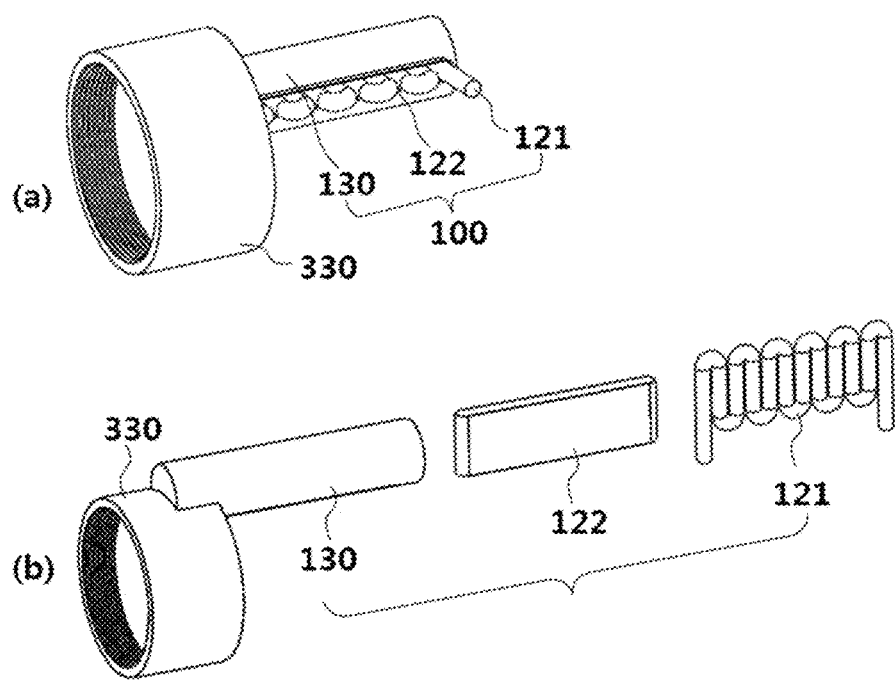
FIG. 11 depicts an example of an electrostatic field water treatment unit of the electrostatic field water treatment apparatus in accordance with the third illustrative embodiment of the present invention.
Figure 12:
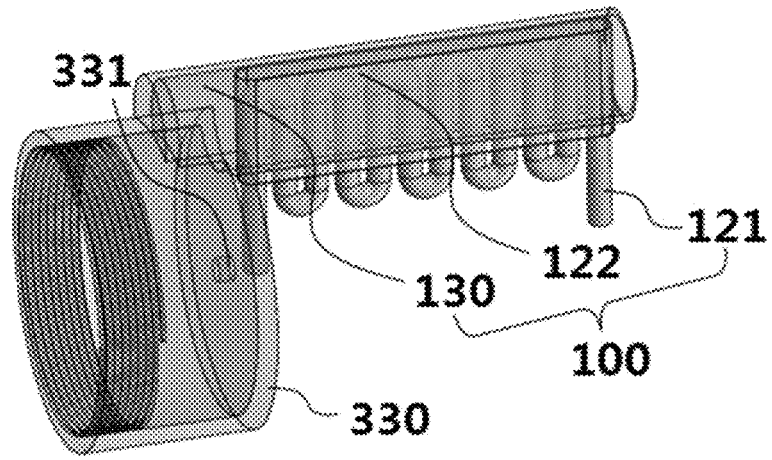
FIG. 12 is a perspective view of the electrostatic field water treatment unit of the electrostatic field water treatment apparatus in accordance with the third illustrative embodiment of the present invention.
Figure 13:
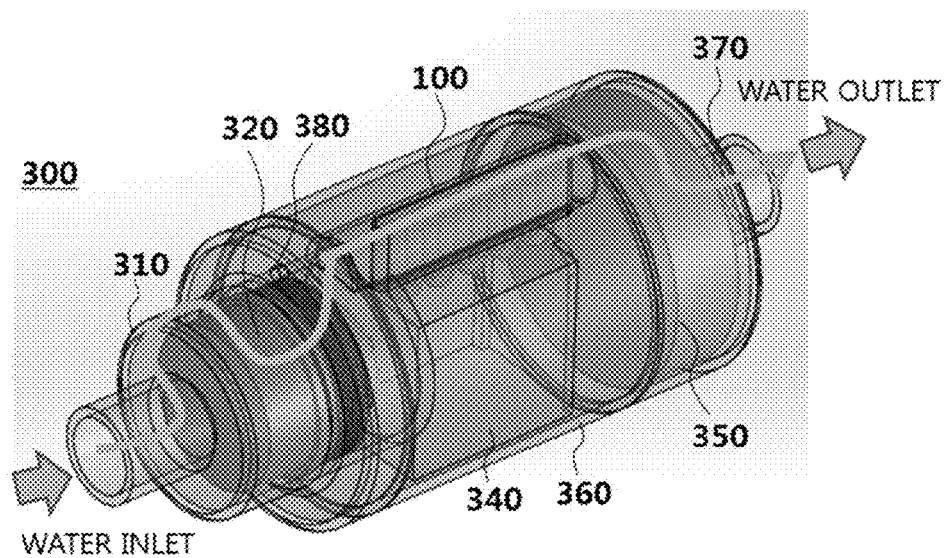
FIG. 13 is a projective perspective view of the electrostatic field water treatment apparatus in accordance with the third illustrative embodiment of the present invention.

FIG. 9 depicts an example of a configuration of an electrostatic field water treatment apparatus in accordance with a third illustrative embodiment of the present invention, FIG. 10 is an exploded perspective view of the electrostatic field water treatment apparatus in accordance with the third illustrative embodiment of the present invention, FIG. 11 depicts an example of an electrostatic field water treatment unit of the electrostatic field water treatment apparatus in accordance with the third illustrative embodiment of the present invention, FIG. 12 is a perspective view of the electrostatic field water treatment unit of the electrostatic field water treatment apparatus in accordance with the third illustrative embodiment of the present invention, and FIG. 13 is a projective perspective view of the electrostatic field water treatment apparatus in accordance with the third illustrative embodiment of the present invention. FIG. 10(a) is a perspective view of the electrostatic field water treatment apparatus, as seen from a water inlet direction, and FIG. 10(b) is a perspective view of the electrostatic field water treatment apparatus, as seen from a water outlet direction. Also, FIG. 11(a) depicts a coupling relation between the electrostatic field water treatment unit 100 and a fixing unit 330, and FIG. 11(b) is an exploded perspective view of the electrostatic field water treatment unit 100 and the fixing unit 330.

As shown in FIG. 9, an electrostatic field water treatment apparatus 300 in accordance with the third illustrative embodiment of the present invention can be used with being mounted to a shower, a sink, a washstand, a water piping device and the like.

The electrostatic field water treatment apparatus 300 in accordance with the third illustrative embodiment of the present invention includes a water inlet fixing member 310 coupled to a pipe into which water is to be introduced, a turbo generator 320 fixed to the water inlet fixing member 310 and configured to generate electricity, an electrostatic field water treatment unit 100 configured to remove bacteria or scale included in the water introduced through the pipe by using a high voltage, a fixing unit 330 coupled to the electrostatic field water treatment unit 100 and fixed to the turbo generator 320, a high-voltage converter 340 configured to change a voltage generated at the turbo generator 320 into a high voltage, a filter 350 configured to filter the water having passed through the electrostatic field water treatment unit 100, a water outlet fixing member 370 coupled to a pipe through which the water is to be discharged, and a main body 360 configured to cover the turbo generator 320, the electrostatic field water treatment unit 100, the fixing unit 330, the high-voltage converter 340 and the filter 350 disposed between the water inlet fixing member 310 and the water outlet fixing member 370, as shown in FIGS. 9 to 13.

As the electrostatic field water treatment unit 100, the electrostatic field water treatment apparatus 100 in accordance with the first illustrative embodiment of the present invention, which has been described with reference to FIGS. 2 to 5, may be used. Making an additional remark, the electrostatic field water treatment apparatus in accordance with the first illustrative embodiment of the present invention, which has been described with reference to FIGS. 2 to 5, may be independently used or may configure one electrostatic field water treatment apparatus together with a variety of constitutional elements shown in FIGS. 9 to 13.

Therefore, the electrostatic field water treatment unit 100 may include the high voltage unit 120 to which the high voltage is to be supplied and the earth ground unit 130 connected to the earth ground and used as a pipe through which the water passes, and the high voltage unit 120 may be disposed at a central part of the earth ground unit 130. In particular, the high voltage unit 120 may include the high voltage insulation cable 121 to which the high voltage is to be supplied and the electrode case 122 configured to cover the high voltage insulation cable 121 and formed of a non-conductor (glass, polyethylene, polypropylene, PVC or Teflon). As described above, the configuration and function of the electrostatic field water treatment unit 100 are the same as the electrostatic field water treatment apparatus 100 in accordance with the first illustrative embodiment of the present invention and the descriptions thereof are thus omitted.

The water inlet fixing member 310 may be coupled to a pipe into which water of the shower is to be introduced, for example.

The turbo generator 320 can generate electricity with being fixed to the water inlet fixing member 310. Therefore, the electrostatic field water treatment apparatus 300 in accordance with the third illustrative embodiment of the present invention is not necessarily required to have a separate power supply device. A voltage generated at the turbo generator 320 is converted into the high voltage, which is to be used in the electrostatic field water treatment unit 100, through the high-voltage converter 340.

The fixing unit 330 is coupled to the electrostatic field water treatment unit 100 and is fixed to the turbo generator 320. The fixing unit 330 may be a conductor and may be particularly used as the earth ground of the electrostatic field water treatment unit 100. The fixing unit 330 may be configured by a screw and may be fastened to the turbo generator. The fixing unit 330 may be formed with a fixing unit hole 331 through which an output cable of the turbo generator 320 can pass. The output cable is coupled to an input of the high-voltage converter 340.

The high-voltage converter 340 is configured to change a voltage generated at the turbo generator 320 into the high voltage.

The filter 350 is configured to filter the water having passed through the electrostatic field water treatment unit 100. The filter 350 is fixed to the water outlet fixing member 370 and has a function of filtering rust or foreign matters in the water. The filter 350 may be periodically replaced.

The water inlet fixing member 310, the water outlet fixing member 370 and the main body 360 form an outward appearance of the electrostatic field water treatment apparatus in accordance with the third illustrative embodiment of the present invention.

The water inlet fixing member 310, the water outlet fixing member 370 and the main body 360 may be mounted with a light emitting diode (LED) 380. The light emitting diode 380 has a function of displaying operation and output states of the electrostatic field water treatment apparatus 300.

Making an additional remark, the third illustrative embodiment includes the first illustrative embodiment, and particularly, can self-generate electricity by using the turbo generator 320 and by water pressure and can feed power. Therefore, the third illustrative embodiment relates to the independent type electrostatic field water treatment apparatus of self-turbo power generation, which does not require the external power feeding.

In the third illustrative embodiment, the water is introduced into the water inlet fixing member 310, and a bolt screw structure on an outer side of the turbo generator 320 is coupled to a nut screw structure of the water outlet fixing member 370. The water introduced through the water inlet fixing member 310 is introduced into the turbo generator 320, thereby rotating an impeller of a rotator to which a permanent magnet of the turbo generator 320 is attached. Thereby, an alternating current voltage is output from a coil wound on a fixed core structure. The turbo generator 320 is configured to rectify the generated alternating current voltage and to output a direct current voltage. The output direct current voltage is applied to the high-voltage converter 340, so that the high voltage is obtained.

The water flowing out from the turbo generator 320 passes through the fixing unit 330. A nut screw of the fixing unit 330 is coupled to the bolt screw structure provided on the outer side of the turbo generator 320. The fixing unit 330 is formed with the fixing unit hole 331. A cable to which the direct current voltage generated at the turbo generator 320 is to be output is discharged through the fixing unit hole 331 and is coupled to the input of the high-voltage converter 340.

The fixing unit 330 is connected to the earth ground unit 130 that is to be applied to the first illustrative embodiment. The earth ground unit 130 is connected to the earth ground, and the water passes in the earth ground unit 130. That is, the earth ground unit 130 to be connected to the fixing unit 330 is used as the pipe through which the water passes.

The fixing unit 330 is used as the earth ground with being connected to the earth ground unit 130.

Figure 14:
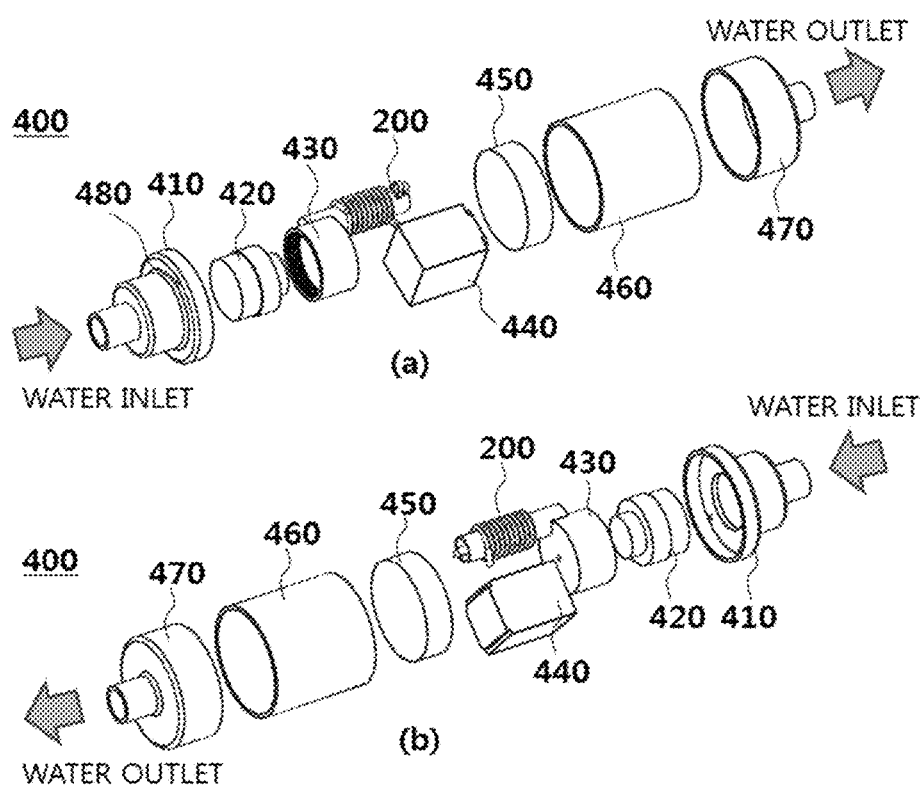
FIG. 14 is an exploded perspective view of an electrostatic field water treatment apparatus in accordance with a fourth illustrative embodiment of the present invention.
Figure 15:
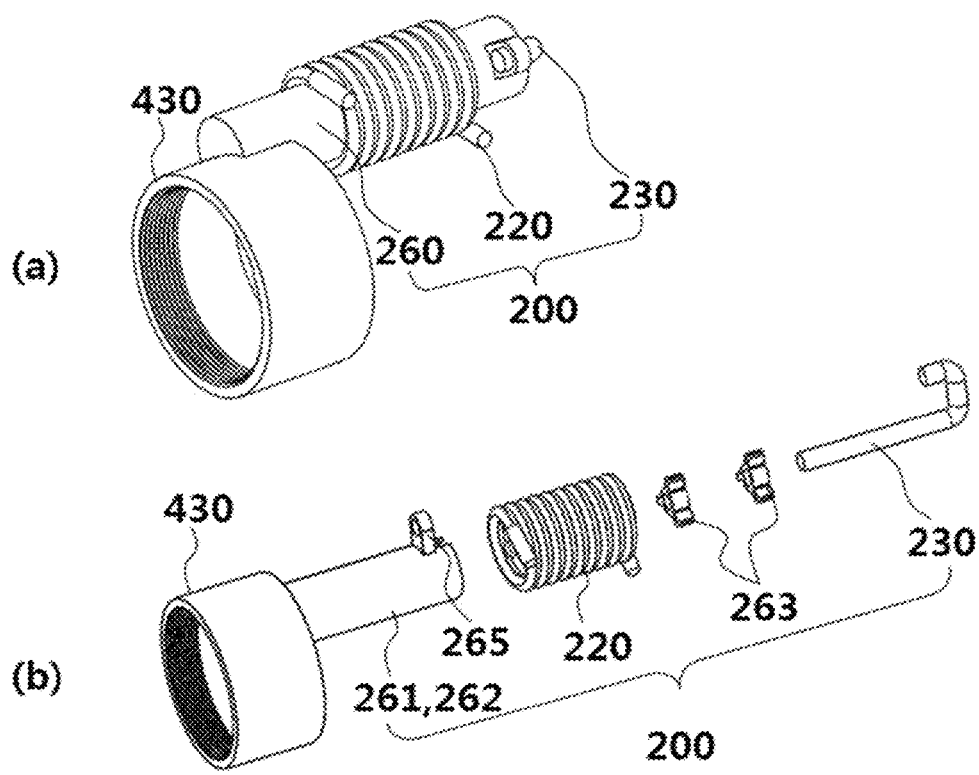
FIG. 15 depicts an example of a water treatment unit of the electrostatic field water treatment apparatus in accordance with the fourth illustrative embodiment of the present invention.
Figure 16:
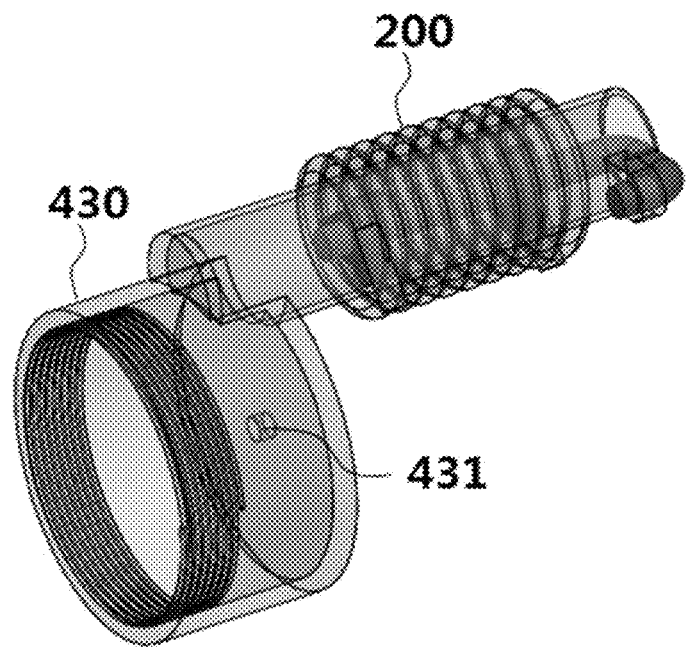
FIG. 16 is a perspective view of the water treatment unit of the electrostatic field water treatment apparatus in accordance with the fourth illustrative embodiment of the present invention.
Figure 17:
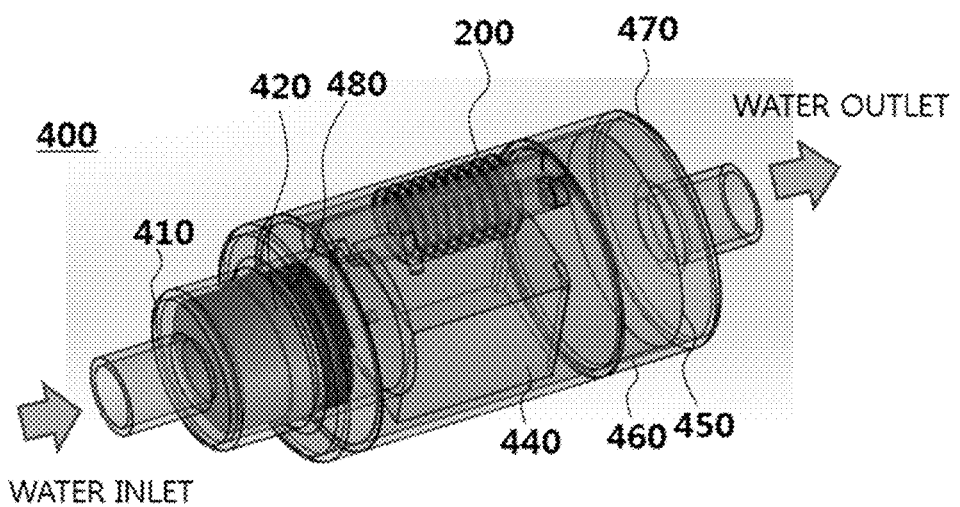
FIG. 17 is a projective perspective view of the electrostatic field water treatment apparatus in accordance with the fourth illustrative embodiment of the present invention.

FIG. 14 is an exploded perspective view of an electrostatic field water treatment apparatus in accordance with a fourth illustrative embodiment of the present invention, FIG. 15 depicts an example of a water treatment unit of the electrostatic field water treatment apparatus in accordance with the fourth illustrative embodiment of the present invention, FIG. 16 is a perspective view of the water treatment unit of the electrostatic field water treatment apparatus in accordance with the fourth illustrative embodiment of the present invention, and FIG. 17 is a projective perspective view of the electrostatic field water treatment apparatus in accordance with the fourth illustrative embodiment of the present invention. FIG. 14(*a*) is a perspective view of the electrostatic field water treatment apparatus, as seen from the water inlet direction, and FIG. 14(*b*) is a perspective view of the electrostatic field water treatment apparatus, as seen from the water outlet direction. FIG. 15(*a*) depicts a coupling relation between the electrostatic field water treatment unit 200 and a fixing unit 430, and FIG. 15(*b*) is an exploded perspective view of the electrostatic field water treatment unit 200 and the fixing unit 430.

An electrostatic field water treatment apparatus 400 in accordance with the fourth illustrative embodiment of the present invention can be used with being mounted to a shower, a sink, a washstand, a water piping device or the like, like the third illustrative embodiment. The electrostatic field water treatment apparatus 400 in accordance with the fourth illustrative embodiment of the present invention is different from the electrostatic field water treatment apparatus 300 in accordance with the third illustrative embodiment of the present invention, in terms of the configuration of the electrostatic field water treatment unit.

Therefore, the electrostatic field water treatment apparatus 400 in accordance with the fourth illustrative embodiment of the present invention includes a water inlet fixing member 410 coupled to a pipe into which water is to be introduced, a turbo generator 420 fixed to the water inlet fixing member 410 and configured to generate electricity, an electrostatic field water treatment unit 200 configured to remove bacteria or scale included in the water introduced through the pipe by using a high voltage, a fixing unit 430 coupled to the electrostatic field water treatment unit 200 and fixed to the turbo generator 420, a high-voltage converter 440 configured to change a voltage generated at the turbo generator 420 into a high voltage, a filter 450 configured to filter the water having passed through the electrostatic field water treatment unit 200, a water outlet fixing member 470 coupled to a pipe through which the water is to be discharged, a main body 460 configured to cover the turbo generator 420, the electrostatic field water treatment unit 200, the fixing unit 430, the high-voltage converter 440 and the filter 450 disposed between the water inlet fixing member 410 and the water outlet fixing member 470, and a light emitting diode 480, as shown in FIGS. 14 to 17.

The structures and functions of the water inlet fixing member 410, the turbo generator 420, the fixing unit 430, the high-voltage converter 440, the filter 450, the main body 460, the water outlet fixing member 470 and the light emitting diode 480 are the same as those of the constitutional elements of the third illustrative embodiment of the present invention and the descriptions thereof are thus omitted.

Also, as the electrostatic field water treatment unit 200, the electrostatic field water treatment apparatus 100 in accordance with the second illustrative embodiment of the present invention, which has been described with reference to FIGS. 6 to 8, may be used. Making an additional remark, the electrostatic field water treatment apparatus in accordance with the second illustrative embodiment of the present invention, which has been described with reference to FIGS. 6 to 8, may be independently used or may configure one electrostatic field water treatment apparatus together with a variety of constitutional elements shown in FIGS. 14 to 17.

Therefore, the electrostatic field water treatment unit 200 includes the high voltage unit 220 having a high voltage insulation cable to which a high voltage is to be supplied, the pipe 260 which is surrounded by the high voltage insulation cable and water passes therethrough, and the earth ground unit 230 disposed in the pipe, formed to have a rod shape and connected to the earth ground. Herein, the part 262 of the pipe 260 surrounded by the high voltage unit 220 is formed of a non-conductor.

The fixing unit 430 is coupled to the electrostatic field water treatment unit 200 and is fixed to the turbo generator 420. The fixing unit 430 may be a non-conductor and may be particularly used as the earth ground of the electrostatic field water treatment unit 200. The fixing unit 430 may be configured by a screw and may be fastened to the turbo generator 420. The fixing unit 430 may be formed with a fixing unit hole 431 through which an output cable of the turbo generator 420 can pass. The output cable is discharged through the fixing unit hole 431 and is connected to an input of the high-voltage converter 440.

The non-conductor the pipe 260 is provided with an earth ground unit support member 265 through which the earth ground unit 230 passes, and the pipe 260 is provided therein with a support member 263 configured to support the earth ground unit 230.

Therefore, the pipe 260 may include the second part 262 surrounded by the high voltage unit 220, the first part 261 not surrounded by the high voltage unit 220 and the support member 263. The surface of the pipe 266 may be provided with the earth ground unit support member 265 configured to support the earth ground unit 230.

The fourth illustrative embodiment includes the third illustrative embodiment, and particularly, can self-generate electricity by using the turbo generator 420 and by water pressure and can feed power. Therefore, the fourth illustrative embodiment relates to the independent type electrostatic field water treatment apparatus of self-turbo power generation, which does not require the external power feeding.

Making an additional remark, the fourth illustrative embodiment includes the same constitutional elements as the third illustrative embodiment. However, while the electrostatic field water treatment apparatus 300 in accordance with the third illustrative embodiment includes the electrostatic field water treatment apparatus 100 in accordance with the first illustrative embodiment, as the electrostatic field water treatment unit, the electrostatic field water treatment apparatus 400 in accordance with the fourth illustrative embodiment includes the electrostatic field water treatment apparatus 200 in accordance with the second illustrative embodiment, as the electrostatic field water treatment unit.

Figure 18:
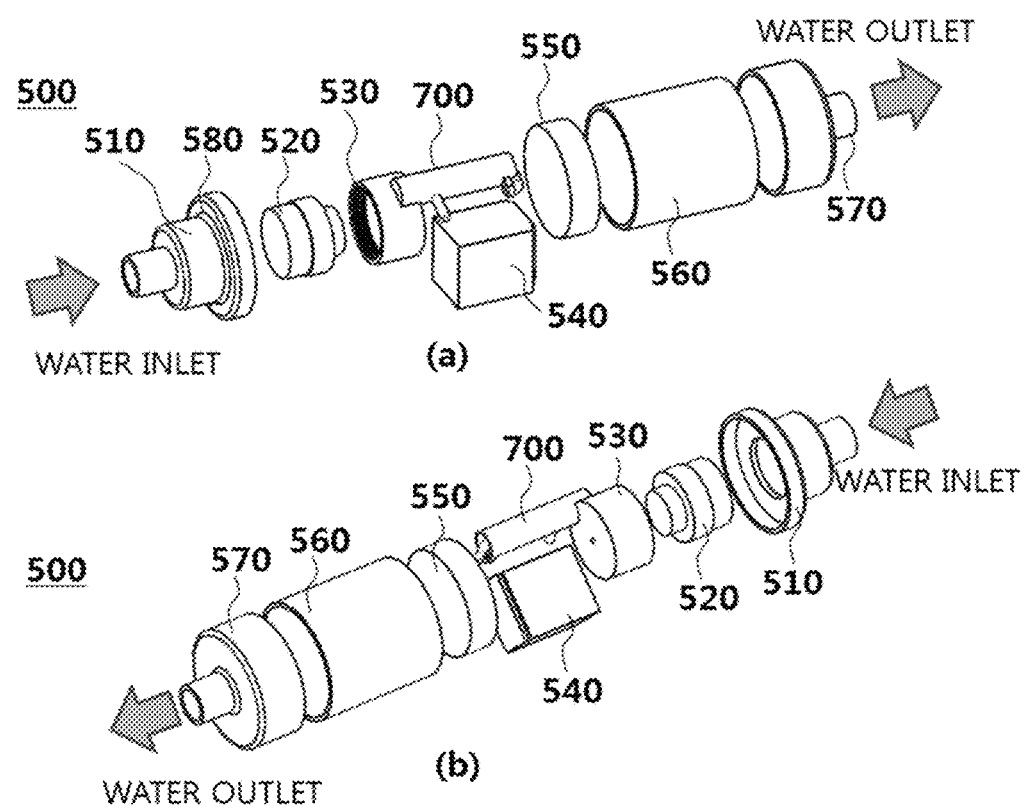
FIG. 18 is an exploded perspective view of an electrostatic field water treatment apparatus in accordance with a fifth illustrative embodiment of the present invention.
Figure 19:
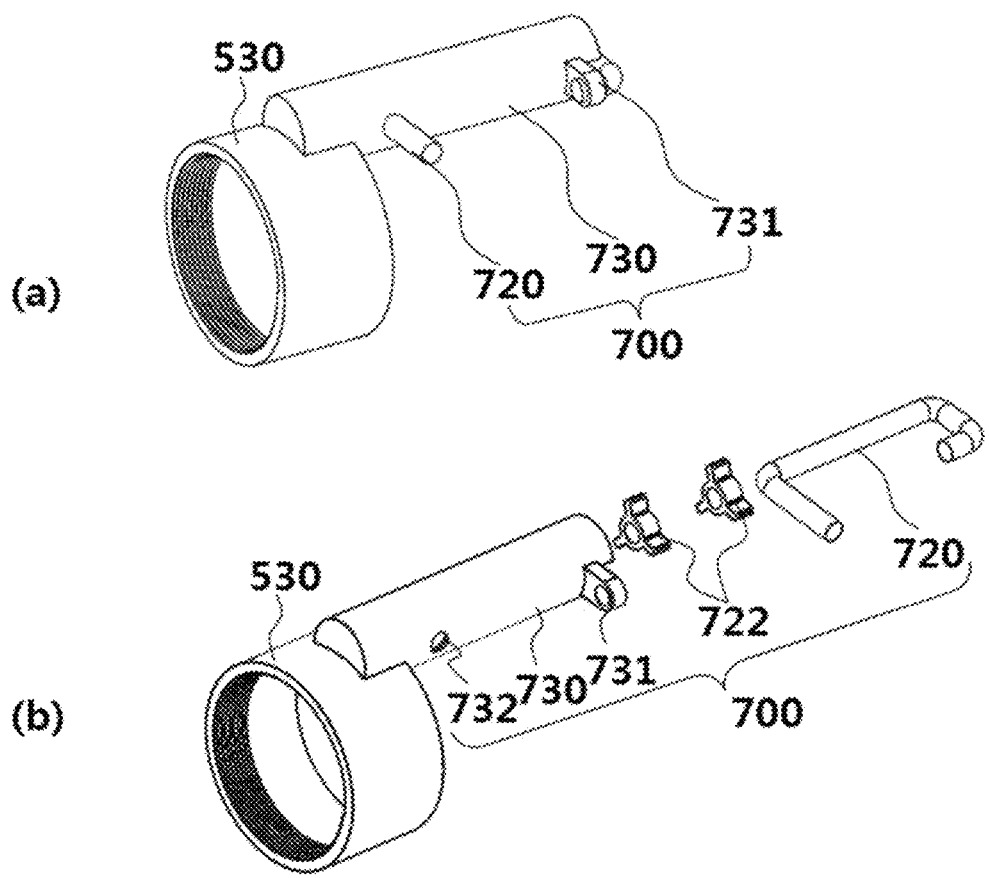
FIG. 19 depicts an example of a water treatment unit of the electrostatic field water treatment apparatus in accordance with the fifth illustrative embodiment of the present invention.
Figure 20:
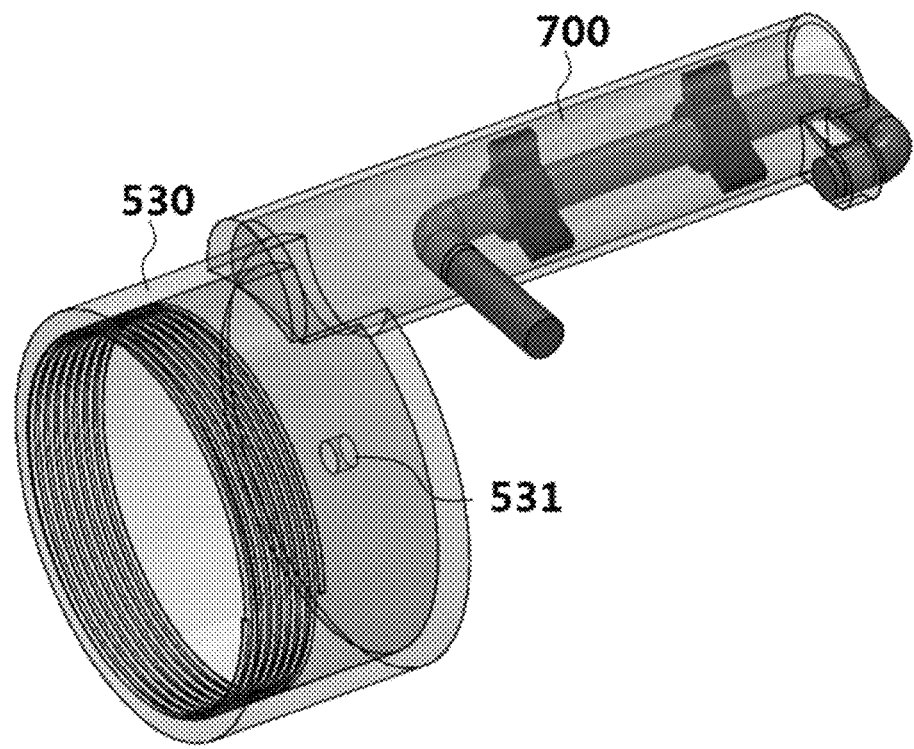
FIG. 20 is a perspective view of the water treatment unit of the electrostatic field water treatment apparatus in accordance with the fifth illustrative embodiment of the present invention.
Figure 21:
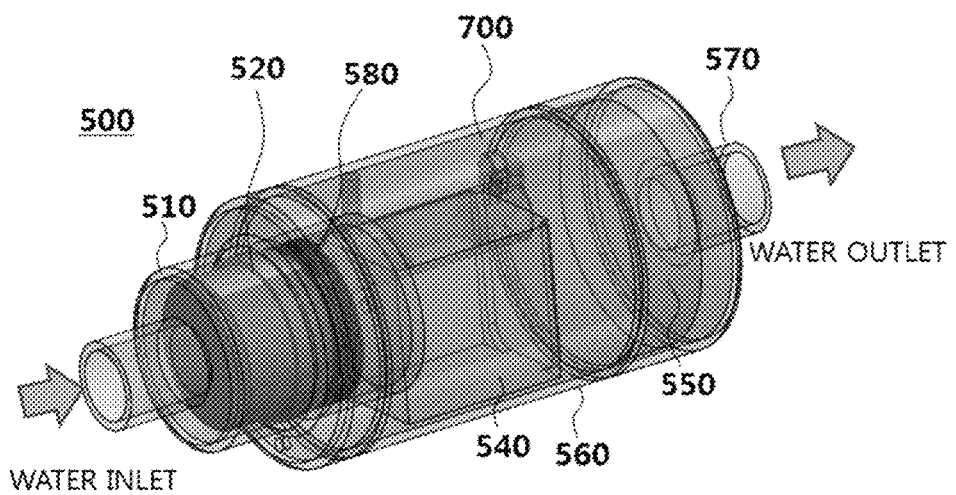
FIG. 21 is a projective perspective view of the electrostatic field water treatment apparatus in accordance with the fifth illustrative embodiment of the present invention.

FIG. 18 is an exploded perspective view of an electrostatic field water treatment apparatus in accordance with a fifth illustrative embodiment of the present invention, FIG. 19 depicts an example of a water treatment unit of the electrostatic field water treatment apparatus in accordance with the fifth illustrative embodiment of the present invention, FIG. 20 is a perspective view of the water treatment unit of the electrostatic field water treatment apparatus in accordance with the fifth illustrative embodiment of the present invention, and FIG. 21 is a projective perspective view of the electrostatic field water treatment apparatus in accordance with the fifth illustrative embodiment of the present invention. FIG. 18(a) is a perspective view of the electrostatic field water treatment apparatus, as seen from the water inlet direction, and FIG. 18(b) is a perspective view of the electrostatic field water treatment apparatus, as seen from the water outlet direction. Also, FIG. 19(a) depicts a coupling relation between an electrostatic field water treatment unit 700 and a fixing unit 530, and FIG. 19(b) is an exploded perspective view of the electrostatic field water treatment unit 700 and the fixing unit 530.

An electrostatic field water treatment apparatus 500 in accordance with the fifth illustrative embodiment of the present invention can be used with being mounted to a shower, a sink, a washstand, a water piping device or the like, like the third and fourth illustrative embodiments. The electrostatic field water treatment apparatus 500 in accordance with the fifth illustrative embodiment of the present invention is different from the electrostatic field water treatment apparatus 300 in accordance with the third illustrative embodiment of the present invention, in terms of the configuration of the electrostatic field water treatment unit 700.

Therefore, the electrostatic field water treatment apparatus 500 in accordance with the fifth illustrative embodiment of the present invention includes a water inlet fixing member 510 coupled to a pipe into which water is to be introduced, a turbo generator 520 fixed to the water inlet fixing member 410 and configured to generate electricity, an electrostatic field water treatment unit 700 configured to remove bacteria or scale included in the water introduced through the pipe by using a high voltage, a fixing unit 530 coupled to the electrostatic field water treatment unit 700 and fixed to the turbo generator 520, a high-voltage converter 540 configured to change a voltage generated at the turbo generator 520 into a high voltage, a filter 550 configured to filter the water having passed through the electrostatic field water treatment unit 700, a water outlet fixing member 570 coupled to a pipe through which the water is to be discharged, a main body 560 configured to cover the turbo generator 520, the electrostatic field water treatment unit 700, the fixing unit 530, the high-voltage converter 540 and the filter 550 disposed between the water inlet fixing member 510 and the water outlet fixing member 570, and a light emitting diode 580, as shown in FIGS. 18 to 21.

The structures and functions of the water inlet fixing member 510, the turbo generator 520, the fixing unit 530, the high-voltage converter 540, the filter 550, the main body 560, the water outlet fixing member 570 and the light emitting diode 580 are the same as those of the constitutional elements of the third and fourth illustrative embodiment of the present invention and the descriptions thereof are thus omitted.

The electrostatic field water treatment unit 700 that is to be applied to the electrostatic field water treatment apparatus in accordance with the fifth illustrative embodiment of the present invention includes a high voltage unit 720 to which the high voltage is to be supplied and a pipe 730 which the water passes therethrough and is connected to the earth ground.

The high voltage unit 720 is disposed in the pipe 730 and is formed to have a rod shape.

The high voltage unit 720 is coupled to the turbo generator 520. The fixing unit 530 is formed with a fixing unit hole 531 through which an output cable of the turbo generator 520 can pass. The output cable is discharged through the fixing unit hole 531 and is connected to an input of the high-voltage converter 540.

A surface of the pipe 730 may be provided with a high voltage unit support member 731 configured to support the rod-shaped high voltage unit 720 and a penetration part 732 through which the rod-shaped high voltage unit 720 passes.

The pipe 730 may be provided therein with a support member 722 configured to support the rod-shaped high voltage unit 720.

The pipe 730 is coupled to the fixing unit 530, and the pipe 730 and the fixing unit 530 serve as the earth ground.

Making an additional remark, the fifth illustrative embodiment includes the same constitutional elements as the third illustrative embodiment and the fourth illustrative embodiment. However, while the electrostatic field water treatment apparatus 300 in accordance with the third illustrative embodiment includes the electrostatic field water treatment apparatus 100 in accordance with the first illustrative embodiment, as the electrostatic field water treatment unit, and the electrostatic field water treatment apparatus 400 in accordance with the fourth illustrative embodiment includes the electrostatic field water treatment apparatus 200 in accordance with the second illustrative embodiment, as the electrostatic field water treatment unit, the electrostatic field water treatment apparatus 400 in accordance with the fifth illustrative embodiment includes the electrostatic field water treatment unit 700.

The electrostatic field water treatment unit 700 that is to be applied to the fifth illustrative embodiment uses a rod-shaped high voltage unit 720 to which a high voltage is to be supplied and an earth ground unit 730 connected to the earth ground and used as a passage through which the water passes.

In the electrostatic field water treatment unit 700 that is to be applied to the fifth illustrative embodiment, a separate complex electrode rod structure and an insulation material are not used.

In the fifth illustrative embodiment, the high voltage insulation cable of the related art is used as the high voltage unit 720, and the high voltage unit 720 is positioned at the center of the earth ground unit 730.

One end of the high voltage unit 720 is fixed to the high voltage unit support member 731 provided at one end of the pipe used as the earth ground unit 730. The other end of the high voltage unit 720 provided in the pipe is supported by the support member 722. The other end of the high voltage unit 720 is discharged to the outside of the pipe through the penetration part 732.

The pipe used as the earth ground unit 730 is used as a cathode (−) electrode, is applied with 0V and is grounded, and may be formed of a conductor of iron, aluminum, copper or titanium. The earth ground unit 730 is coupled to the fixing unit 530.

One skilled in the art of the present invention can understand that the present invention can be implemented in different specific forms without departing from the technical spirit and essential features. Therefore, it should be understood that the above-described illustrative embodiments are simply exemplary and are not limitative. The scope of the present invention is defined by the claims, not the above descriptions. It should also be construed that all changes or modifications to be deduced from the meanings of the claims and the equivalent concepts thereof are to be included in the scope of the present invention.

DESCRIPTION OF REFERENCE NUMERALS 120, 220, 720: high voltage unit
130, 230, 730: earth ground unit

The invention claimed is:
1. An electrostatic field water treatment apparatus comprising:
   a water inlet fixing member coupled to a pipe into which water is to be introduced;
   a turbo generator fixed to the water inlet fixing member and configured to generate electricity;
   an electrostatic field water treatment unit configured to remove bacteria or scale included in the water introduced through the pipe by using a high voltage;
   a fixing unit coupled to the electrostatic field water treatment unit and fixed to an output unit of the turbo generator;
   a high-voltage converter configured to change a voltage generated at the turbo generator into a high voltage;
   a filter disposed at a rear end of the electrostatic field water treatment unit and configured to filter the water having passed through the electrostatic field water treatment unit;
   a water outlet fixing member coupled to a pipe through which the water is to be discharged, and
   a main body configured to cover the turbo generator, the electrostatic field water treatment unit, the fixing unit, the high-voltage converter and the filter disposed between the water inlet fixing member and the water outlet fixing member,
   wherein a direction of the water inlet fixing member and the water outlet fixing member forms a straight line,
   wherein the electrostatic field water treatment unit comprises a high voltage unit comprising a high voltage insulation cable to which the high voltage is to be supplied, a pipe coupled to an upper part of a rear end of the fixing unit, through which water is to pass and which is covered by the high voltage insulation cable, and an earth ground unit disposed in the pipe, formed to have a rod shape and connected to an earth ground,
   wherein a part of the pipe covered by the high voltage unit is formed of an insulator,
   wherein the insulator is formed of any one of glass, polyethylene, polypropylene, PVC and Teflon,
   wherein the high-voltage converter is disposed at the rear end of the fixing unit and next to the electrostatic field water treatment unit.

* * * * *